United States Patent
Theimer

(10) Patent No.: US 6,526,486 B2
(45) Date of Patent: Feb. 25, 2003

(54) METHOD OF MANAGING MESSAGES IN A COMPUTER MEMORY

(75) Inventor: Wolfgang Theimer, Bochum (DE)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/871,866

(22) Filed: Jun. 1, 2001

(65) Prior Publication Data

US 2002/0004381 A1 Jan. 10, 2002

Related U.S. Application Data

(63) Continuation-in-part of application No. 09/173,489, filed on Oct. 14, 1998, now abandoned.

(51) Int. Cl.⁷ ............................. G06F 12/00; H04B 1/18
(52) U.S. Cl. ..................... 711/159; 711/133; 455/186.1
(58) Field of Search .................. 711/159, 160, 711/133, 134, 136; 709/203, 212, 217–219; 455/9, 14, 447, 186; 712/207; 340/825.5, 825.44

(56) References Cited

U.S. PATENT DOCUMENTS

| 4,988,991 | A |   | 1/1991  | Motegi ................... 340/825.5 |
| 5,239,679 | A |   | 8/1993  | Murai ........................ 455/38.1 |
| 5,258,751 | A |   | 11/1993 | DeLuca et al. ......... 340/825.44 |
| 5,418,528 | A |   | 5/1995  | Hosack et al. ......... 340/825.44 |
| 5,915,207 | A | * | 6/1999  | Dao et al. ...................... 455/9 |
| 5,944,815 | A | * | 8/1999  | Witt ........................... 712/207 |
| 6,012,126 | A | * | 1/2000  | Aggarwal et al. ........... 711/133 |
| 6,157,942 | A | * | 12/2000 | Chu et al. .................... 709/203 |

FOREIGN PATENT DOCUMENTS

| DE | 38 33 905 A1 | 4/1990 |
| DE | 41 23 979 A1 | 1/1993 |
| DE | 42 07 664 A1 | 9/1993 |

* cited by examiner

Primary Examiner—Do Hyun Yoo
Assistant Examiner—Kimberly McLean-Mayo
(74) Attorney, Agent, or Firm—Perman & Green, LLP

(57) ABSTRACT

Memory management method in which lifetimes are assigned to messages which are to be written into a memory, and in which, in addition, when the memory is full and further messages arrive those stored messages whose period of activation has expired the longest are cleared.

7 Claims, 4 Drawing Sheets

| HEADER VARIABLE | SIGNIFICANCE |
|---|---|
| $i$ | ID OF MESSAGE $i$ |
| $t_{di}$ | TRANSMISSION TIME OF MESSAGE $i$ |
| $\Delta t_i$ | DURATION OF LIFE OF MESSAGE $i$ ($\infty$ OR LARGE NUMBER FOR PERMANENT MESSAGES) |
| $t_{si}$ | ACTIVATION TIME OF MESSAGE $i$ |
| $\Delta t_{ri}$ | TIME INTERVAL AFTER WHICH REPETITION OF $i$ TAKES PLACE |
| $x_i$ | GPS POSITION FOR ACTIVATION OF $i$ |
| $r_i$ | ACTIVATION RADIUS BY $x_i$ |
| $\varphi_i$ | DIRECTION OF VEHICLE MOVEMENT WITH $x_i$ |
| $l_i$ | LENGTH OF MESSAGE $i$ |

FIG.1

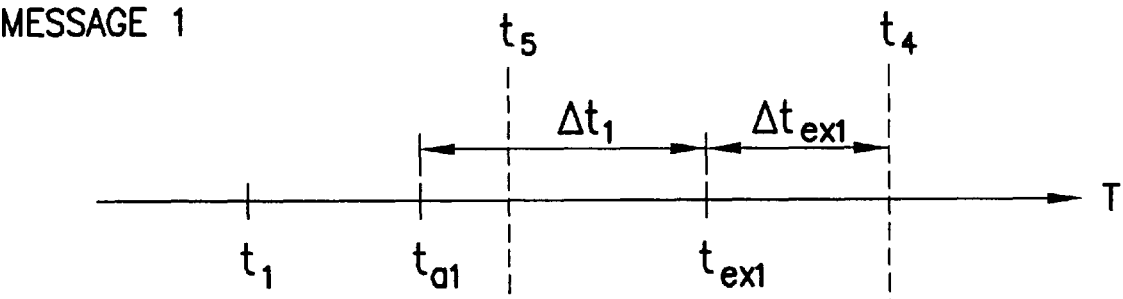
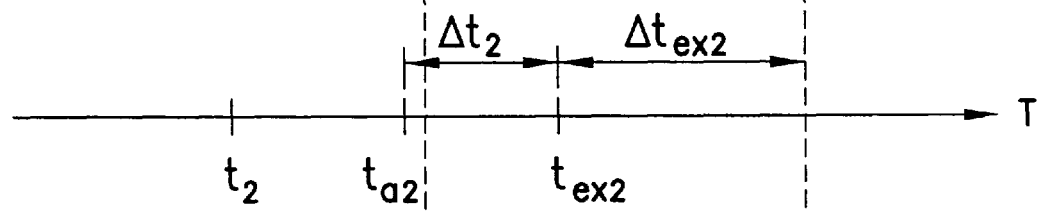
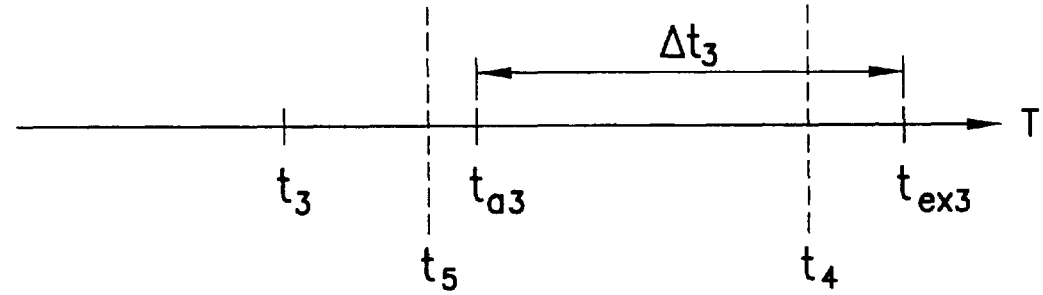
FIG.4

METHOD OF MANAGING MESSAGES IN A COMPUTER MEMORY

This is a continuation in part application of application Ser. No. 09/173,489, filed Oct. 14, 1998, based on German patent application serial number 197 45 540.9, filed Oct. 15, 1997. Said parent U.S. application is now abandoned.

FIELD OF INVENTION

The invention relates to a memory management method for a computer memory of a mobile communication device which can be used, for example, in a vehicle navigation system.

BACKGROUND OF THE INVENTION

Voice commands are an effective method of directing a driver through traffic without him being distracted too much from the traffic situation. While basic commands such as "turn left" occur in almost all navigation tasks, there is also a large number of less frequently used audible messages which are important only at certain times. Audio messages which have to be output by a vehicle navigation system are, however, generally very memory-intensive. For this reason, generally known navigation systems today are contained in CD-ROMs or ROM-based autonomous systems. These systems are autonomous in the sense that they do not carry out any network-based route planning but rather have all the information in the vehicle and the calculation of routes also takes place there locally. A disadvantage of such vehicle navigation systems is consequently the completely defined dialogue which can only be changed by replacing the CD-ROM or the ROM chip.

An objective of the invention is to provide a memory management method in which it is possible to administer memory-intensive data, for example, audio data, even with a small memory.

SUMMARY OF THE INVENTION

A memory management method according to the invention is characterized by the fact that lifetimes are assigned to the messages which are to be written into a memory, in which case, in addition, when the memory is full and further messages arrive, those stored messages whose lifetime, i.e., period of activation, has expired the longest are cleared. The lifetime provides information on how important, i.e. how probable, it is that the respective message stored in the memory has to be played back. Here, the lifetimes can also be increased or reduced if necessary or desired. After a message has been played back, it is held in the memory until the memory is full when new messages arrive. Then, when new messages arrive, those messages whose lifetime has expired the longest are cleared until sufficient memory space is available again for the new messages. The messages to which lifetimes are assigned may contain, for example, audio data, video data or other memory-intensive data.

According to one development of the invention, the clearing process ends when sufficient free memory space is available for the further messages. In this way, it is ensured that only as many messages are cleared from the memory as is necessary for new messages. As a result, efficient and complete use of the memory is ensured. According to another development of the invention, the clearing process ends when the overall storage area is too small for the further messages. In this case, the further messages are rejected so that the messages already present in the memory are available again.

According to one refinement of the invention, messages which have already been read out are given a reduced lifetime. Messages which have already been read out are frequently no longer significant so that this fact can be allowed for by reducing their lifetime.

According to one further refinement of the invention, the lifetime of a message which has already been read out can also be set to the value zero. Rare messages which have already been played, for example in the field of vehicle navigation, can thus be cleared first, since it is in practice improbable that they will be played back again.

According to yet another refinement of the invention, the messages stored in the memory are sorted according to their lifetimes. The sorting can be carried out here in increasing/decreasing order in terms of the values of the lifetimes. In this way, the message, which is inactive the longest, is located, for example, at the end of the memory can be cleared as a coherent block if the length of the message is known. The sorting of the messages stored in the memory takes place preferably after each message which arrives in the memory.

According to one advantageous refinement of the invention, the messages which are to be written into the memory are dispatched by a service provider via an air interface. This has the advantage that initially only basic messages, for example navigation messages, have to be loaded in a desired language by the service provider during the installation. Other situation-specific messages which are not so frequently used can then be dispatched by the surface provider when required. Furthermore, it is possible to update easily a system which uses the memory management method.

According to one further preferred refinement of the invention, the lifetime of a message is contained in each case in a header of this message. As a result, the entire message does not need to be read through for the lifetime, for example, in order to change or update the message.

The header of a message can also contain additional header variables on the basis of which the respective messages are played back if the header variables lie in predefined value ranges or exceed predefined threshold values. Moreover, it is conceivable for each message to contain more than one header if this is necessary for managing the specifically used messages.

DESCRIPTION OF THE DRAWING

An exemplary embodiment of the invention used in a vehicle navigation system is described in more detail below with reference to the appended drawings, in which:

FIG. 1 shows a table with the header variables contained in the header of a message i;

FIG. 4 is a time chart defining the time parameters of a series of messages.

DETAILED DESCRIPTION OF THE INVENTION

FIG. 1 shows a table in which the header variables contained in the header of a message i are listed. In particular, the header variables have the following significance. The header variable i refers to an ID (identity) of a message i according to which each message can be identified unambiguously. Further header variables contained in the header of a message i are the transmission time $t_{di}$ of a message i from the service provider into the memory, and the duration of life $\Delta t_1$ of a message i. The duration of life of a message i is the time in which the message is effective, i.e., the period of activation. It provides the basis on which the probability with which the respective message is overwritten by a new message, to be stored in the memory, if the memory is full. If, for example, the message i is to remain permanently in the memory, a very large value must be selected for the header variable $\Delta t_1$ or else must tend towards infinity. The header of the messages used in the exemplary embodiment also contains the header variable $\Delta t_{ai}$, in order to activate a message i for a specific time. In order to play back a message repeatedly, a further header variable $\Delta t_{ri}$ specifies a time interval after which the message i is repeated.

In order to activate a specific message i when a specific GPS position is reached, the header of the message i also contains a header variable $x_1$. Since specific messages already have to be played back in the vicinity of a specific GPS position, a further header variable $r_1$ is provided for this, which variable defines an activation radius about the GPS position $x_1$ for the activation of the message i. In many cases, it is also significant whether the vehicle is moving in a specific position at a GPS position. For this reason, a further header variable $1i$. is provided which defines the direction of vehicle movement at a GPS position $x_1$ for the activation of a message i. Finally, the header of a message i also contains the header variable $1i$, in which the length of the message i is contained.

An audible message is composed of a header and a data field in which voice data, voice recognition parameters or other binary files may be contained. If the voice message is present in a compressed form, it is decoded in a vehicle terminal, which normally requires less computing time than with a voice decoder in the network. Here, the message header in which the header variables are contained determines the activation conditions of the voice command.

Figure 2:
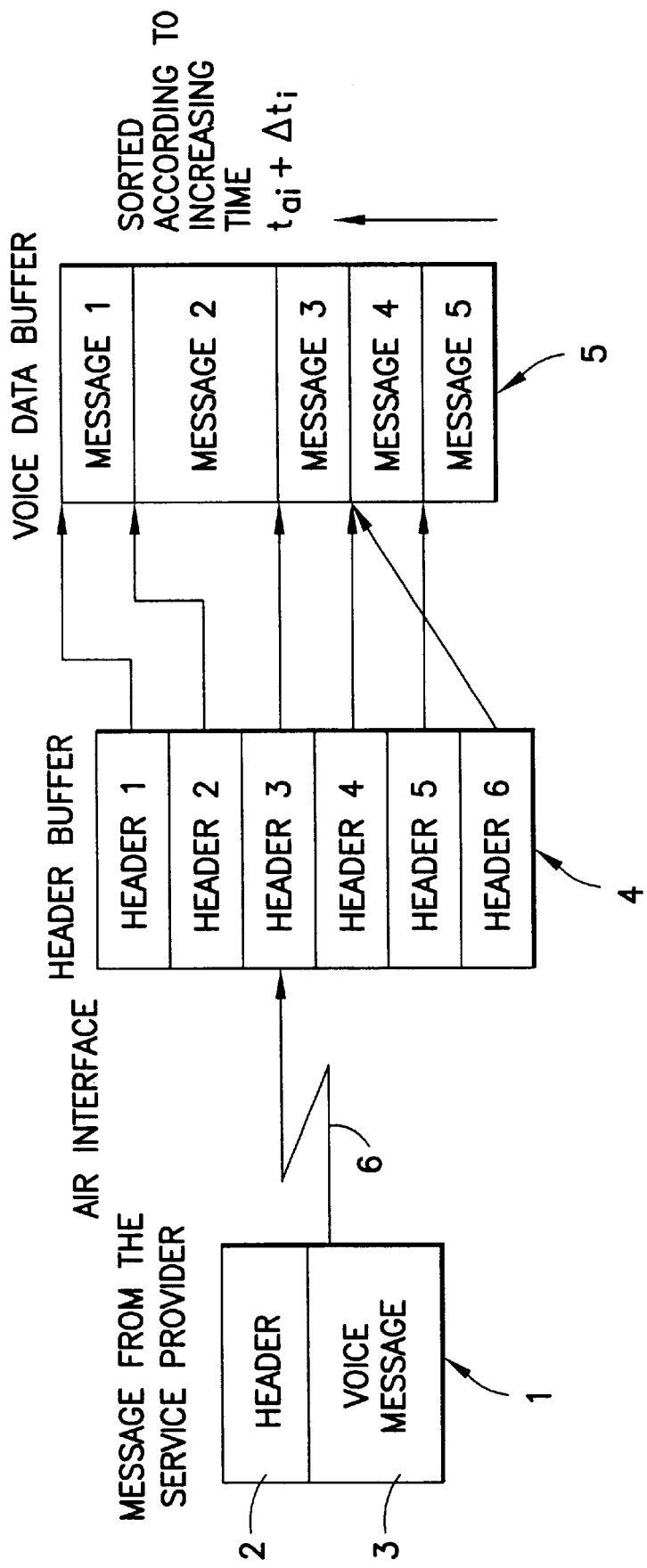
FIG. 2 shows the concept of the memory management method for messages i in accordance with the exemplary embodiment according to FIG. 1.

FIG. 2 shows the storage concept of the memory management method according to the exemplary embodiment in FIG. 1. As shown therein, a message 1 which is transmitted by the service provider contains the header 2 and a data field 3 containing the voice message. Here, the message which has been decomposed into header and data, is written into two different data buffers, namely into a header buffer 4 and into a voice data buffer 5 after the message has been transmitted by the service provider via an air interface 6 to a vehicle navigation system, for example.

After permanent messages have been loaded during the system initialization in the specified language, the memory is filled with transient messages without clearing. As soon as the memory formed from header data buffer and voice data buffer is full, the so-called "duration-of-life concept" comes into play. This means that firstly the header 2 of a new message 1 is loaded into a buffer, and the length $l_i$ of the current message is evaluated. For this reason, it is easy to define, in the header buffer 4, pointers to the start of each message stored in the voice data buffer 5. Then, all the messages whose lifetimes have run the longest are cleared, the oldest message being located at the end of the voice data buffer 5, so that it can be cleared as a coherent block, if memory space is required for a new message. Consequently, in FIG. 2, the message 1 has the longest duration of life while the message 5 is cleared first. The clearing process is aborted if sufficient free memory space is available or the overall memory area is too small.

FIG. 2 shows the data structure for a situation with five messages. Message 1 has the longest duration of life while message 5 is the first candidate for the clearing process. Message 6 refers to the data field of a permanently present message 4, as a result of which it consequently does not need to be reloaded and does not use up any additional data memory.

The transmission of data from the service provider to the vehicle navigation system in which the memory management method according to the invention is used can be minimized by virtue of the fact that, whenever a message is cleared, the system signals back the ID of this message to the service provider. A record of the last transmission is then stored in the network, so that the messages which are lost only have to be resent selectively.

According to the "duration-of-life storage concept" according to FIG. 2, rare messages which have already been played are given a reduced lifetime $\Delta t_i$ (typical for vehicle navigation). A message which is triggered by a GPS position is initially given a high value for the activation time $t_{ai}$ ($t_{ai} \leq t_{di}$), as a result of which the probability of this message being overwritten is relatively small, since firstly the messages i with I=arg min ($t_{ai}+\Delta t_l$) are cleared for all i.

The activation of voice messages can be triggered by a combination of events, which is described in more detail below. The simplest way of activating a voice message is by specifying an activation time $t_{a1}$ for the message i. If $t \geq t_{a1}$ and $t < t_{a1} + \Delta t_l$, the message i is output, t representing the current time. After the activation of the voice message, the lifetime of the message i is set to zero so that it is probable that the message will be cleared. One application of this alarm clock functionality is, for example, playing a memo at a defined time.

Another application consists in the periodic activation of a warning message in the case of faults in the vehicle or other problems which are detected by the system. Here, the message i is played periodically after intervals of the length $\Delta t_{ri}$, as long as $t \geq t_{al}$ and $t < t_{a1} + \Delta t_1$.

In another scenario, the message i is triggered if the vehicle has approached a GPS position $x_1$ as far as a radius $r_1$. The duration of life $\Delta t_l$ of the message is initially very large, the message i being output if $[x-x_i] \leq r_1$ and $\Delta t_1 > 0$. Here, x represents the current vehicle position. This position-dependent activation is typical of route planning in which the system directs the driver to specific road intersections with driving instructions. The radius should be proportional to the speed of the vehicle in order to take into account an appropriate reaction time.

Since the direction of the vehicle on a road can completely change the optimum route planning, an orientation angle $\psi_1$ is optionally added to the header of the message. The message is reliable, and should be played back, only if the angular difference between the direction $\psi$ of the vehicle and the planned direction $\psi_1$ is smaller than a threshold value $\Delta \psi$. This means that the message I is played back if $[x-x_i] \leq r_1$ and $[\psi-\psi_1] \leq \Delta \psi$ and $\Delta t_1 > 0$, the activation time $t_{a1}$ being set equal to the transmission time $t_{di}$ of the message i, and the duration of life $\Delta t_1$ being set equal to zero. This causes the message to be activated in a circular segment about $x_l$ with $\psi_1$ as the preferred orientation and an angular extent of $2 \Delta \psi$. The above mentioned conditions for the activation of voice messages can also be expanded or else combined with one another as desired.

Figure 3:
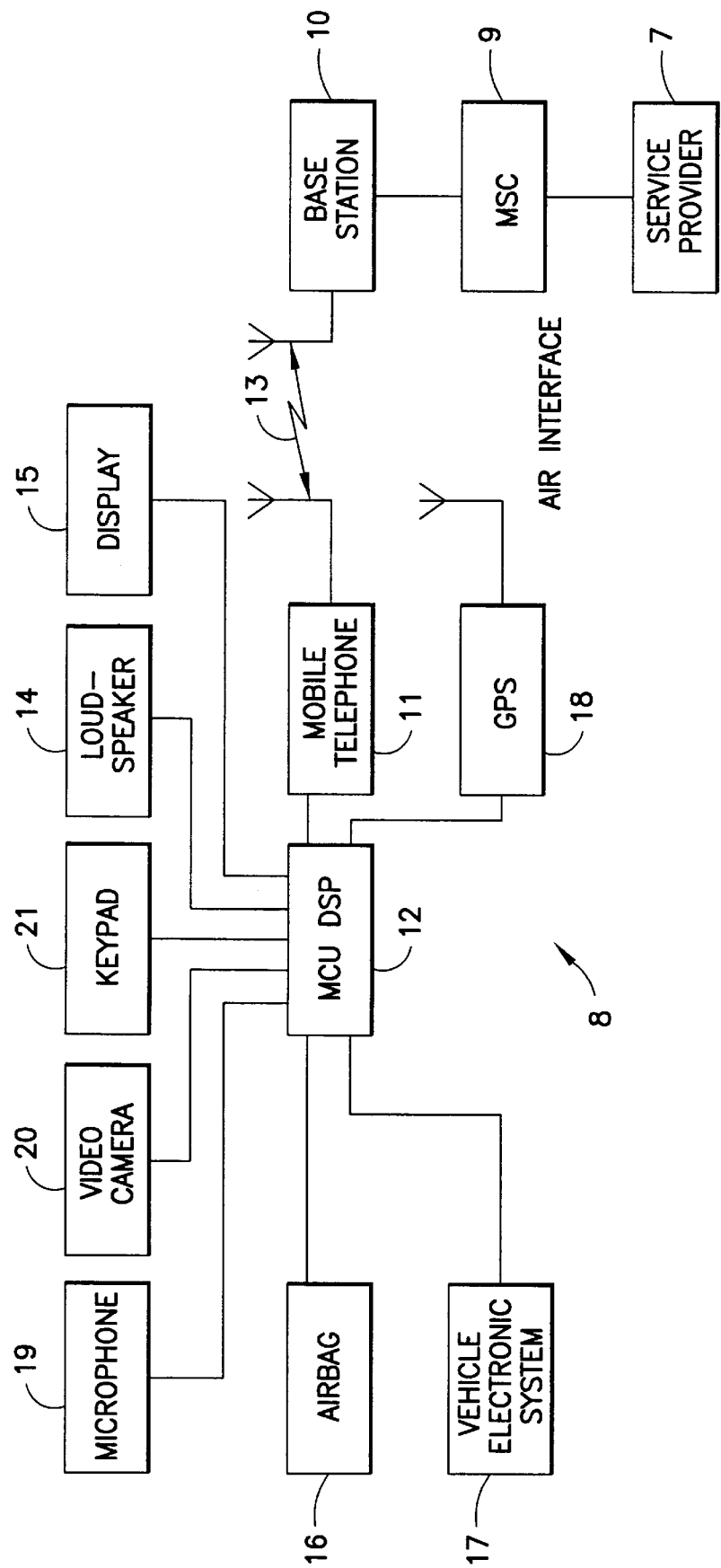
FIG. 3 shows a hardware implementation of a vehicle navigation system in which the memory management method according to the invention is used.

FIG. 3 shows a hardware implementation of a vehicle navigation system in which the memory management method according to the invention can be used. The implementation of the vehicle navigation system shown in FIG. 3 uses WEB technology. The service provider 7 communicates with a vehicle terminal 8 via HTTP (hypertext transfer protocol) which is based on the mobile radio data link. The service provider 7 transmits the messages to be transmitted via an mobile switching center 9 and a base station 10 to a mobile telephone 11 which is coupled to the vehicle navigation system.

A vehicle service program uses a switched WEB server 12 in order to set up an HTTP link via the air interface 13. The voice data are then processed exclusively in the applications program.

In order to output messages visually and/or audibly, the microprogram control unit MCU 12 which is used as the WEB server is connected to a loudspeaker 14 and/or to a display 15. In addition, the MCU continuously receives data from an airbag 16 and from the vehicle electronic system 17. These data can be used, for example, for outputting warning signals periodically via the loudspeaker 14 or the display 15 if faults in the vehicle or other problems occur. In the same way, in the event of an emergency, the service provider 7 can be informed via the mobile telephone 11 and the air interface 13.

As FIG. 3 also shows, the MCU 12 is connected to a GPS receiver 18 in order to be able to determine the current vehicle position at any time, which is of decisive significance for vehicle navigation.

In order to permit a user to communicate with the MCU, the vehicle navigation system also includes a microphone 19, a video camera 20 and a keypad 21.

Another possible application of the memory management method according to the invention is, for example, loading a situation-specific vocabulary supplement which is independent of the speaker, for voice recognition from the mobile radio network. In this case, a basic vocabulary remains permanently active, it being possible to add new words as a function of the situation. The recognition parameters of these commands are loaded when required and temporarily increase the vocabulary.

Likewise, it is possible, with the aid of the memory management method according to the invention, to load context-dependent vocabulary expansions for voice recognition in order to support the driver. A foreign visiting driver can then select his language and thus use the equipment if the voice commands are loaded in his language by the service provider. Bilingual control is thus also possible.

In addition, specific voice commands 25 may be introduced, even after the system has been sold. If the vehicle terminal supports the modification of the user interface, the recognized vocabulary can also be changed in order to implement the user interface.

Furthermore, the memory could contain traffic messages 30 with a regional focus, in which case firstly all the traffic messages are received and then messages, whose locations are remote from the current vehicle position within a defined radius, are given a longer duration of life $\Delta t_1$.

With the memory management method according to the invention it is consequently possible to use a relatively small memory, which is relevant in particular for low-end products, for which the duration-of-life concept of messages provides a great advantage. Furthermore, it is conceivable for the overall size of the memory to be adapted dynamically as a function of the number of applications with their memory requirements. However, the concept is, in the case of a large memory, also important for high-end systems when audio-visual multimedia messages are dispatched. The memory requirements for such messages can quickly exceed the available memory space.

In the embodiment shown in FIG. 4, the key parameters of a message are defined. Each message has a lifetime $\Delta t$ during which the message is usable and needs to be accessible, i.e., the period of activation. The lifetime $\Delta t$ is defined as the period of time between the activation of the message $t_a$ and the expiration of its usefulness $t_{ex}$. These parameters are entered in the header of the message for use in the mobile device. In the preferred process of this invention, the clearing of messages to provide memory for new incoming messages is dependent on the period of time $\Delta t_{ex}$ between expiration $t_{ex}$ and the transmission time t of a new message. This time period is measured for each message. If the memory is full at time t when a new message arrives, the memory is cleared according to a predetermined algorithm which selects the messages having the longest period of time $\Delta t_{ex}$ since expiration. The messages can be sorted by the parameter $\Delta t_{ex}$.

In FIG. 4, messages 1–3 are shown to illustrate the algorithm. Message 1 is transmitted at time t1 for activation at time ta1. The useful lifetime of the message 1 is shown as $\Delta t_1$. Message 2 and 3 are similarly represented with the referenced subscript. In the first instance, message 4 is transmitted for storage in the memory at $t_4$. At this time message 3 is still activated within its useful lifetime $\Delta t_3$, so only message 1 and message 2 are cued for deletion from the memory. In this instance $\Delta t_{ex1}$ is less than $\Delta t_{ex2}$, which will result in message 2 being deleted to make room for message 4. In the instance of message 5, which is transmitted earlier at $t_5$, messages 1–3 are still within their lifetimes. Message 5 will be bumped without deletions until such time as a prior message expires and its period after expiration renders it in the cue for deletion. In this manner only messages which have out lived their usefulness are candidates for removal and no activated messages will be lost.

I claim:

1. In a mobile communications network, a method of identifying messages transmitted in said mobile communications network for storage in a memory and for clearing said messages comprising the steps of:

creating a header for each message stored in said memory, said header containing required identifiers;

setting a lifetime for each of said stored messages in said header, said lifetime being a period in which the stored message can be actuated;

measuring a period of time from expiration of said lifetime to a transmission of a new message;

when there is insufficient memory available for storing a new message, selecting one or more of said stored messages with a longest period of time from expiration of said lifetime, clearing said selected one or more of said stored messages and replacing said one or more of said stored messages with said new message, and signaling back the identifier of each of said one or more of said stored messages replaced with said new message; and storing a last transmission in said mobile communications network, so that messages which are lost only have to be resent selectively.

2. In a mobile communications network, a method of identifying messages for storage in a memory and for clearing said messages, as described in claim 1, wherein the clearing process ends when sufficient free memory space is available for the new messages.

3. In a mobile communications network, a method of identifying messages for storage in a memory and for clearing said messages, as described in claim 1, wherein the clearing process ends when the overall memory area is too small for the new messages.

4. In a mobile communications network, a method of identifying messages for storage in a memory and for clearing said messages, as described in claim 1, wherein messages which have already been read out are given a reduced lifetime.

5. In a mobile communications network, a method of identifying messages for storage in a memory and for clearing said messages, as described in claim 4, wherein the reduced lifetime is set to zero.

6. In a mobile communications network, a method of identifying messages for storage in a memory and for clearing said messages, as described in claim 1, wherein messages which are stored in the memory are sorted by the period of time from the expiration of said lifetime for said messages.

7. In a mobile communications network, a method of identifying messages for storage in a memory and for clearing said messages, as described in claim 1, wherein the memory, in which the messages are stored, is part of a mobile station, said station being connected to a service provider by said mobile communications network, and the messages which are to be written into the memory are dispatched by said service provider via an air interface.

* * * * *